United States Patent
Smith et al.

(10) Patent No.: US 7,240,604 B2
(45) Date of Patent: Jul. 10, 2007

(54) ELECTRO-HYDRAULIC METERING VALVE WITH INTEGRAL FLOW CONTROL

(75) Inventors: David P. Smith, Reddick, IL (US); Daniel T. Mather, Lockport, IL (US)

(73) Assignees: Caterpillar Inc, Peoria, IL (US); Shin Caterpillar Mitsubishi Ltd. (JP)

( * ) Notice: Subject to any disclaimer, the term of this patent is extended or adjusted under 35 U.S.C. 154(b) by 0 days.

(21) Appl. No.: 11/192,036

(22) Filed: Jul. 29, 2005

(65) Prior Publication Data

US 2007/0022871 A1    Feb. 1, 2007

(51) Int. Cl.
*F15B 13/04* (2006.01)
*F16K 31/12* (2006.01)

(52) U.S. Cl. ..................... 91/454; 251/30.01

(58) Field of Classification Search .................. 91/454; 251/30.01, 30.02, 33, 43, 44
See application file for complete search history.

(56) References Cited

U.S. PATENT DOCUMENTS

| | | | |
|---|---|---|---|
| 4,553,732 A * | 11/1985 | Brundage et al. | 251/30.01 |
| 4,623,118 A * | 11/1986 | Kumar | 251/30.01 |
| 5,136,930 A | 8/1992 | Karakama et al. | |
| 5,144,881 A | 9/1992 | Cakmaz | |
| 5,271,599 A * | 12/1993 | Kolchinsky et al. | 251/30.01 |
| 5,868,059 A | 2/1999 | Smith | |
| 5,878,647 A | 3/1999 | Wilke et al. | |
| 6,198,369 B1 | 3/2001 | Ward et al. | |
| 6,276,663 B1 | 8/2001 | Anderson et al. | |
| 6,392,516 B1 | 5/2002 | Ward et al. | |
| 6,619,183 B2 | 9/2003 | Yoshino | |
| 6,748,738 B2 | 6/2004 | Smith | |
| 6,769,252 B2 | 8/2004 | Smith | |
| 6,848,475 B2 | 2/2005 | Smith | |

* cited by examiner

*Primary Examiner*—Michael Leslie
(74) *Attorney, Agent, or Firm*—Finnegan, Henderson, Farabow, Garrett & Dunner

(57) ABSTRACT

A metering valve for a work machine hydraulic system is disclosed. The metering valve has a valve body with an inlet and an outlet. The metering valve also has a main poppet disposed within the valve body between the inlet and the outlet. The main poppet has a nose end and a chamber end, and is movable between a flow-passing position at which fluid flows from the inlet to the outlet, and a flow-blocking position at which fluid flow between the inlet and outlet is blocked. The metering valve also has a pilot element movable to selectively communicate the chamber end of the main poppet with a drain, thereby affecting movement of the main poppet between the flow-passing and flow-blocking positions. The metering valve further has a solenoid mechanism operable to move the pilot element. The position of the pilot element is affected by a fluid pressure at the inlet.

22 Claims, 3 Drawing Sheets

ELECTRO-HYDRAULIC METERING VALVE WITH INTEGRAL FLOW CONTROL

TECHNICAL FIELD

The present disclosure relates generally to an electro-hydraulic metering valve and, more particularly, to an electro-hydraulic metering valve having flow control.

BACKGROUND

Work machines such as, for example, excavators, loaders, dozers, motor graders, and other types of heavy machinery use one or more hydraulic actuators to accomplish a variety of tasks. These actuators are fluidly connected to a pump on the work machine that provides pressurized fluid to chambers within the actuators. An electro-hydraulic valve arrangement is typically fluidly connected between the pump and the actuators to control a flow rate of pressurized fluid to and from the chambers of the actuators. The fluid flow rate into and out of the chambers of the actuators directly relates to a speed of the actuators.

Work machine hydraulic circuits that fluidly connect multiple actuators to a common pump may experience undesirable pressure fluctuations within the circuits during operation of the actuators. In particular, the pressure of a fluid supplied to one actuator may undesirably fluctuate in response to a different actuator consuming fluid from or expelling fluid to the same hydraulic circuit. These pressure fluctuations may cause inconsistent and/or unexpected actuator movements when the electro-hydraulic valve arrangement is area-controlled. In particular, to move an actuator at a desired speed, an element of the electro-hydraulic valve arrangement may be moved to open a fluid passageway to a particular opening area. The particular opening area is based upon an assumed supplied pressure that corresponds to a desired flow rate and resulting actuator speed. When the pressure of the fluid supplied to the electro-hydraulic valve arrangement deviates from the assumed pressure, the flow rate and resulting speed of the actuator proportionally deviate from the desired flow rate and speed.

One method of improving control over the flow rate of fluid supplied to an actuator is described in U.S. Pat. No. 5,878,647 (the '647 patent) issued to Wilke et al. on Mar. 9, 1999. The '647 patent describes a hydraulic circuit having two supply valves, a variable displacement pump, and a hydraulic actuator. The supply valves connect the variable displacement pump to either a head-end or a rod-end of the hydraulic actuator to cause movement of the hydraulic actuator. Each of these supply valves contains a pressure compensating mechanism that senses the pressure at the outlet of the supply valves and provides the greatest of those pressures to a control input of the variable displacement pump to affect operation of the variable displacement pump. The operation of the variable displacement pump may be affected to cause the pressure drop across each of the supply valves to be approximately constant, thereby bringing the supplied pressure and resulting flow rate of fluid through each of the solenoid valves closer to the assumed pressure and desired flow rate.

Although the pressure compensating mechanisms described in the '647 patent may reduce pressure fluctuations within the hydraulic circuit, they may be slow to respond, expensive, and increase the unreliability of the hydraulic circuit. Specifically, the pressure compensating mechanisms of the '647 act to affect the pressure of the fluid directed through the supply valves only after sensing an undesired pressure drop across the supply valves. In addition, even after the pressure compensating mechanisms have changed pump performance, the effects of the change may not be realized immediately. By the time the undesired pressure drop has been adjusted to match the assumed pressure drop, the flow rate of fluid supplied to the actuator may already have deviated from the desired flow rate for a substantial period of time. In addition, the added components of the pressure compensating mechanisms may increase the cost and unreliability of the hydraulic circuit.

The disclosed metering valve is directed to overcoming one or more of the problems set forth above.

SUMMARY OF THE INVENTION

In one aspect, the present disclosure is directed to a metering valve. The metering valve includes a valve body having an inlet and an outlet. The metering valve also has a main poppet disposed within the valve body between the inlet and the outlet. The main poppet has a nose end and a chamber end, and is movable between a flow-passing position at which fluid flows from the inlet to the outlet, and a flow-blocking position at which fluid flow between the inlet and outlet is blocked. The metering valve also has a pilot element movable to selectively communicate the chamber end of the main poppet with a drain, thereby affecting movement of the main poppet between the flow-passing and flow-blocking positions. The metering valve further has a solenoid mechanism operable to move the pilot element. The position of the pilot element is affected by a fluid pressure at the inlet.

In another aspect, the present disclosure is directed to a method of operating a metering valve. The method includes directing a flow of pressurized fluid to a main poppet of the metering valve. The method further includes electronically moving a pilot element to hydraulically move the main poppet to a predetermined position and allow the pressurized fluid to flow through the metering valve at a desired rate. The method also includes automatically hydraulically adjusting the position of the pilot element in response to a pressure of the fluid to maintain the desired flow rate through the metering valve.

DETAILED DESCRIPTION

Figure 1:
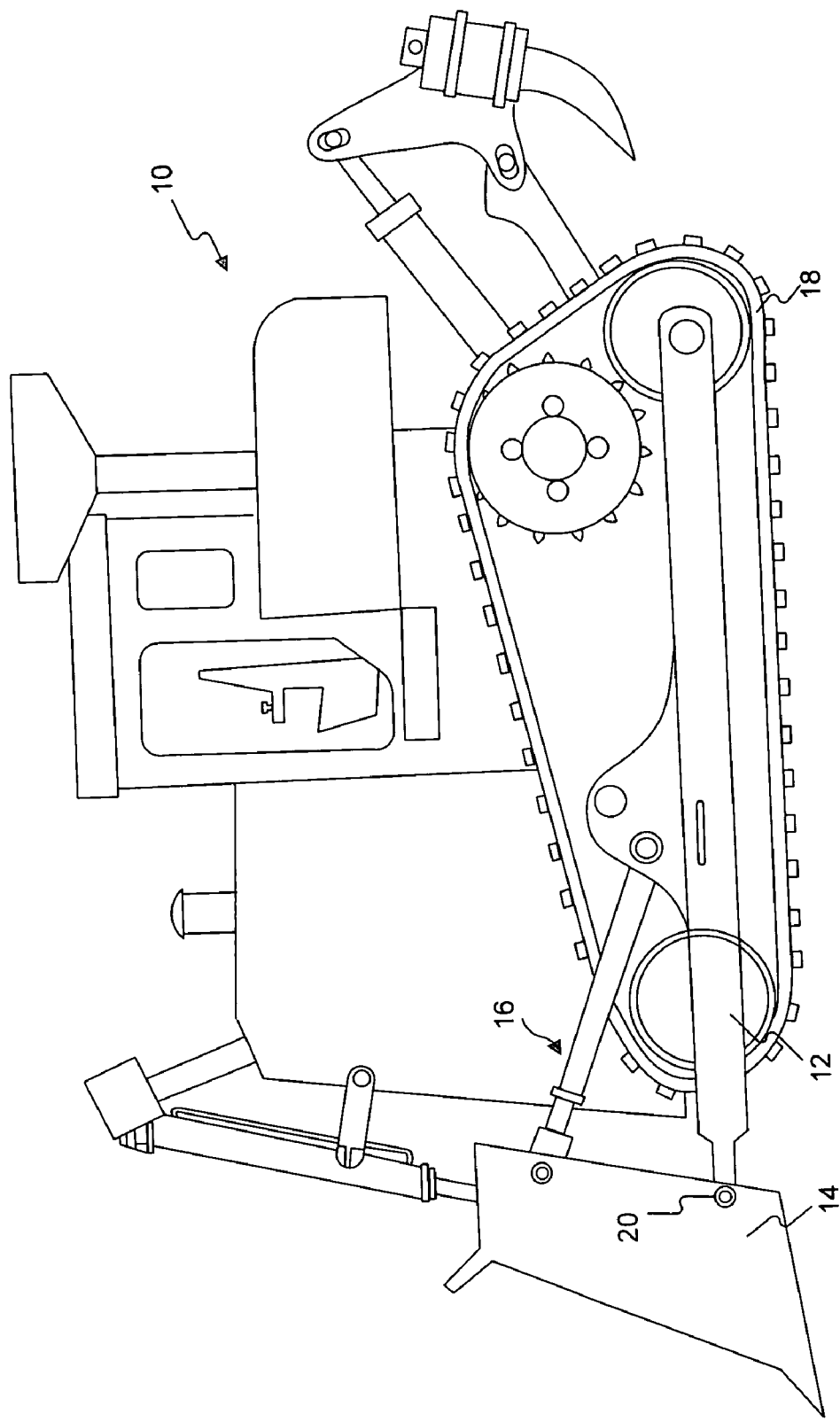
FIG. 1 is a side-view diagrammatic illustration of a work machine according to an exemplary disclosed embodiment.

FIG. 1 illustrates an exemplary work machine 10. Work machine 10 may embody a mobile machine that performs some type of operation associated with an industry such as mining, construction, farming, transportation, or any other industry known in the art. For example, work machine 10 may be an earth moving machine such as an excavator, a dozer, a loader, a backhoe, a motor grader, a dump truck, or any other earth moving machine. Work machine 10 may also embody a fixed machine such as a generator set, a pump, or any other suitable operation-performing work machine. Work machine 10 may include a frame 12, at least one work implement 14, and a hydraulic cylinder 16 connecting work implement 14 to frame 12. It is contemplated that hydraulic cylinder 16 may be omitted, if desired, and a hydraulic motor alternatively included.

Frame 12 may include a structural unit that supports movement of work machine 10. Frame 12 may embody, for example, a stationary base frame connecting a power source (not shown) to a traction device 18, a movable frame member of a linkage system, or any other frame known in the art.

Work implement 14 may embody a device used in the performance of a task. For example, work implement 14 may embody a blade, a bucket, a shovel, a ripper, a dump bed, a propelling device, or any other task-performing device known in the art. Work implement 14 may be connected to frame 12 via a direct pivot 20, via a linkage system with hydraulic cylinder 16 forming one member in the linkage system, or in any other appropriate manner. Work implement 14 may be configured to pivot, rotate, slide, swing, or move relative to frame 12 in any other manner known in the art.

Figure 2:
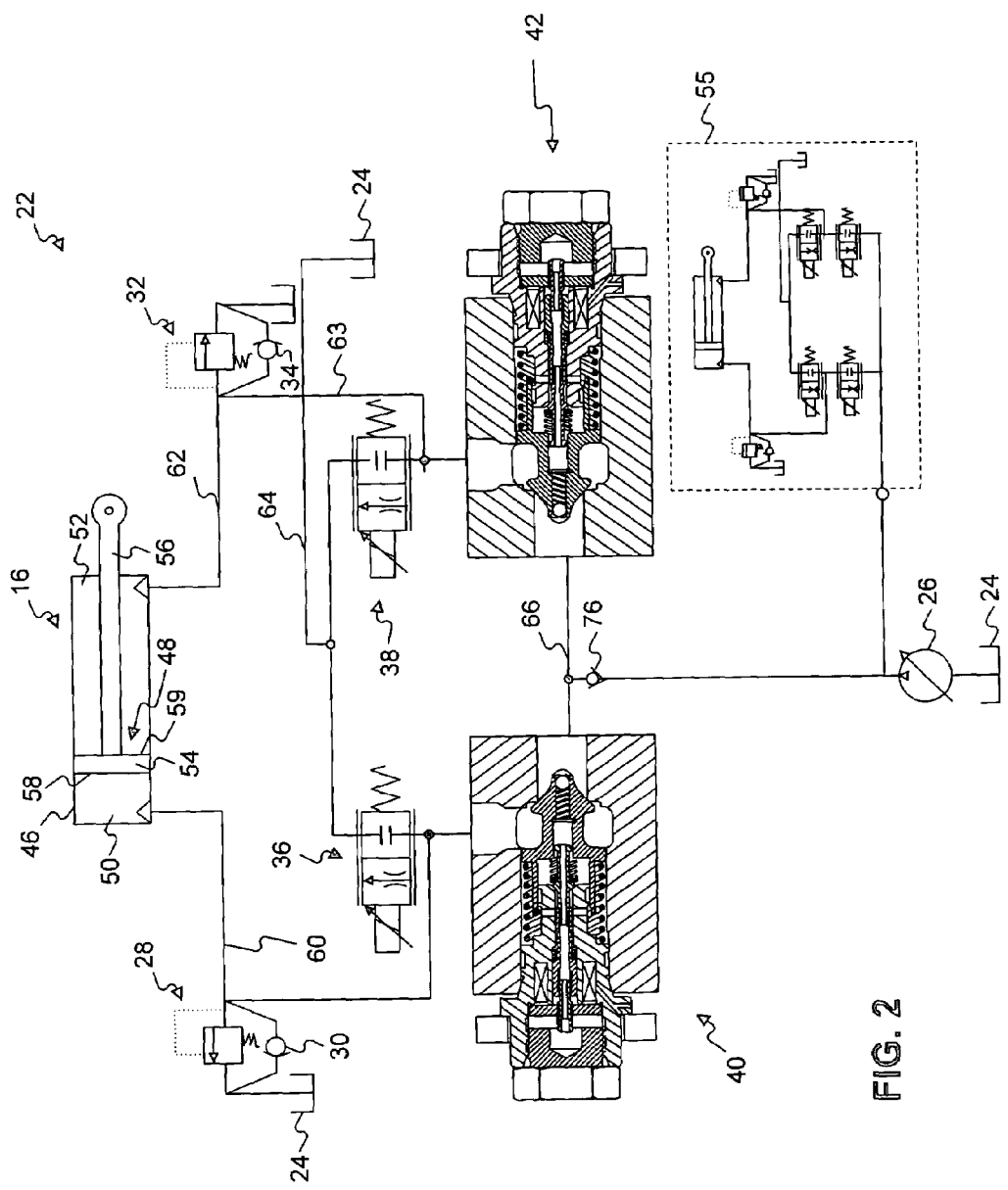
FIG. 2 is a schematic illustration of an exemplary disclosed hydraulic circuit for the work machine of FIG. 1.

As illustrated in FIG. 2, hydraulic cylinder 16 may be one of various components within a hydraulic system 22 that cooperate to move work implement 14. Hydraulic system 22 may include a tank 24, a source 26 of pressurized fluid, a head-end pressure relief valve 28, a head-end makeup valve 30, a rod-end pressure relief valve 32, a rod-end makeup valve 34, a head-end drain valve 36, a rod-end drain valve 38, a head-end flow supply valve 40, and a rod-end flow supply valve 42. It is contemplated that hydraulic system 22 may include additional and/or different components such as, for example, a pressure sensor, a temperature sensor, a position sensor, a controller, an accumulator, and other hydraulic system components known in the art.

Hydraulic cylinder 16 may include a tube 46 and a piston assembly 48 disposed within tube 46. One of tube 46 and piston assembly 48 may be pivotally connected to frame 12, while the other of tube 46 and piston assembly 48 may be pivotally connected to work implement 14. It is contemplated that tube 46 and/or piston assembly 48 may alternatively be fixedly connected to either frame 12 or work implement 14. Hydraulic cylinder 16 may include a first chamber 50 and a second chamber 52 separated by piston assembly 48. First and second chambers 50, 52 may be selectively supplied with a fluid pressurized by source 26 and fluidly connected with tank 24 to cause piston assembly 48 to displace within tube 46, thereby changing the effective length of hydraulic cylinder 16. The expansion and retraction of hydraulic cylinder 16 may function to assist in moving work implement 14.

Piston assembly 48 may include a piston 54 axially aligned with and disposed within tube 46, and a piston rod 56 connectable to one of frame 12 and work implement 14 (referring to FIG. 1). Piston 54 may include a first hydraulic surface 58 and a second hydraulic surface 59 opposite first hydraulic surface 58. An imbalance of force caused by fluid pressure on first and second hydraulic surfaces 58, 59 may result in movement of piston assembly 48 within tube 46. For example, a force on first hydraulic surface 58 being greater than a force on second hydraulic surface 59 may cause piston assembly 48 to displace to increase the effective length of hydraulic cylinder 16. Similarly, when a force on second hydraulic surface 59 is greater than a force on first hydraulic surface 58, piston assembly 48 may retract within tube 46 to decrease the effective length of hydraulic cylinder 16. A sealing member (not shown), such as an o-ring, may be connected to piston 54 to restrict a flow of fluid between an internal wall of tube 46 and an outer cylindrical surface of piston 54.

Tank 24 may constitute a reservoir configured to hold a supply of fluid. The fluid may include, for example, a dedicated hydraulic oil, an engine lubrication oil, a transmission lubrication oil, or any other fluid known in the art. One or more hydraulic systems within work machine 10 may draw fluid from and return fluid to tank 24. It is also contemplated that hydraulic system 22 may be connected to multiple separate fluid tanks.

Source 26 may be configured to draw fluid from tank 24 and produce a flow of pressurized fluid directed through hydraulic system 22. Source 26 may embody a pump such as, for example, a variable displacement pump, a fixed displacement pump, or any other source of pressurized fluid known in the art. Source 26 may be drivably connected to a power source (not shown) of work machine 10 by, for example, a countershaft (not shown), a belt (not shown), an electrical circuit (not shown), or in any other suitable manner. Source 26 may be dedicated to supplying pressurized fluid only to hydraulic system 22, or alternatively may supply pressurized fluid to additional hydraulic systems 55 within work machine 10.

Head-end pressure relief valve 28 may fluidly connect first chamber 50 to tank 24 by way of a fluid passageway 60 to relieve pressure from hydraulic system 22. In particular, head-end pressure relief valve 28 may include a valve element that is spring-biased toward a closed or fluid-blocking position and movable toward an open or fluid-passing position in response to a pressure within fluid passageway 60 exceeding a predetermined pressure. In this manner, head-end pressure relief valve 28 may be configured to reduce a pressure spike within hydraulic system 22 caused by external forces acting on work implement 14 and piston 54. It is contemplated that head-end pressure relief valve 28 may be omitted, if desired.

Head-end makeup valve 30 may be configured to allow fluid from tank 24 to flow to first chamber 50 in response to a fluid pressure. Specifically, head-end makeup valve 30 may include a valve element movable from a closed or fluid-blocking position toward an open or fluid-passing position to allow fluid from tank 24 into first chamber 50 in response to a fluid pressure within fluid passageway 60 dropping below a pressure of the fluid within tank 24. In this manner, head-end makeup valve 30 may reduce a drop in pressure within hydraulic system 22 caused by external forces acting on work implement 14 and piston 54. It is contemplated that head-end makeup valve 30 may be omitted, if desired.

Rod-end pressure relief valve 32 may fluidly connect second chamber 52 to tank 24 by way of a fluid passageway 62 to relieve pressure from hydraulic system 22. In particular, rod-end pressure relief valve 32 may include a valve element that is spring-biased toward a closed or fluid-blocking position and movable toward an open or fluid-passing position in response to a pressure within fluid passageway 62 exceeding a predetermined pressure. In this manner, rod-end pressure relief valve 32 may be configured to reduce a pressure spike within hydraulic system 22 caused by external forces acting on work implement 14 and piston 54. It is contemplated that rod-end pressure relief valve 32 may be omitted, if desired.

Rod-end makeup valve 34 may be configured to allow fluid from tank 24 to flow to second chamber 52 in response to a fluid pressure. Specifically, rod-end makeup valve 34 may include a valve element movable from a closed or fluid-blocking position toward an open or fluid-passing position to allow fluid from tank 24 into second chamber 52 in response to a fluid pressure within fluid passageway 62 dropping below a pressure of the fluid within tank 24. In this manner, rod-end makeup valve 34 may reduce a drop in pressure within hydraulic system 22 caused by external forces acting on work implement 14 and piston 54. It is contemplated that rod-end makeup valve 34 may be omitted, if desired.

Head-end and rod-end drain and supply valves 36–42 may be fluidly interconnected. In particular, head-end and rod-end drain valves 36, 38 may be connected in parallel to a common drain passageway 64. Head-end and rod-end flow supply valves 40, 42 may be connected in parallel to an upstream common fluid passageway 66. Head-end flow supply and drain valves 36, 40 may be connected in parallel to fluid passageway 60. Rod-end drain and supply valves 38, 42 may be connected in parallel to fluid passageway 62.

Head-end drain valve 36 may be disposed between first chamber 50 and tank 24 and configured to regulate a flow of pressurized fluid from first chamber 50 to tank 24. Specifically, head-end drain valve 36 may include a proportional spring biased valve mechanism that is solenoid actuated to move between a first position at which fluid is allowed to flow from first chamber 50 and a second position at which fluid is blocked from flowing from first chamber 50. It is also contemplated that head-end drain valve 36 may alternatively be hydraulically actuated, mechanically actuated, pneumatically actuated, or actuated in any other suitable manner.

Rod-end drain valve 38 may be disposed between second chamber 52 and tank 24 and configured to regulate a flow of pressurized fluid from second chamber 52 to tank 24. Specifically, rod-end drain valve 38 may include a proportional spring biased valve mechanism that is solenoid actuated to move between a first position at which fluid is allowed to flow from second chamber 52 and a second position at which fluid is blocked from flowing from second chamber 52. It is also contemplated that rod-end drain valve 38 may alternatively be hydraulically actuated, mechanically actuated, pneumatically actuated, or actuated in any other suitable manner.

Figure 3:
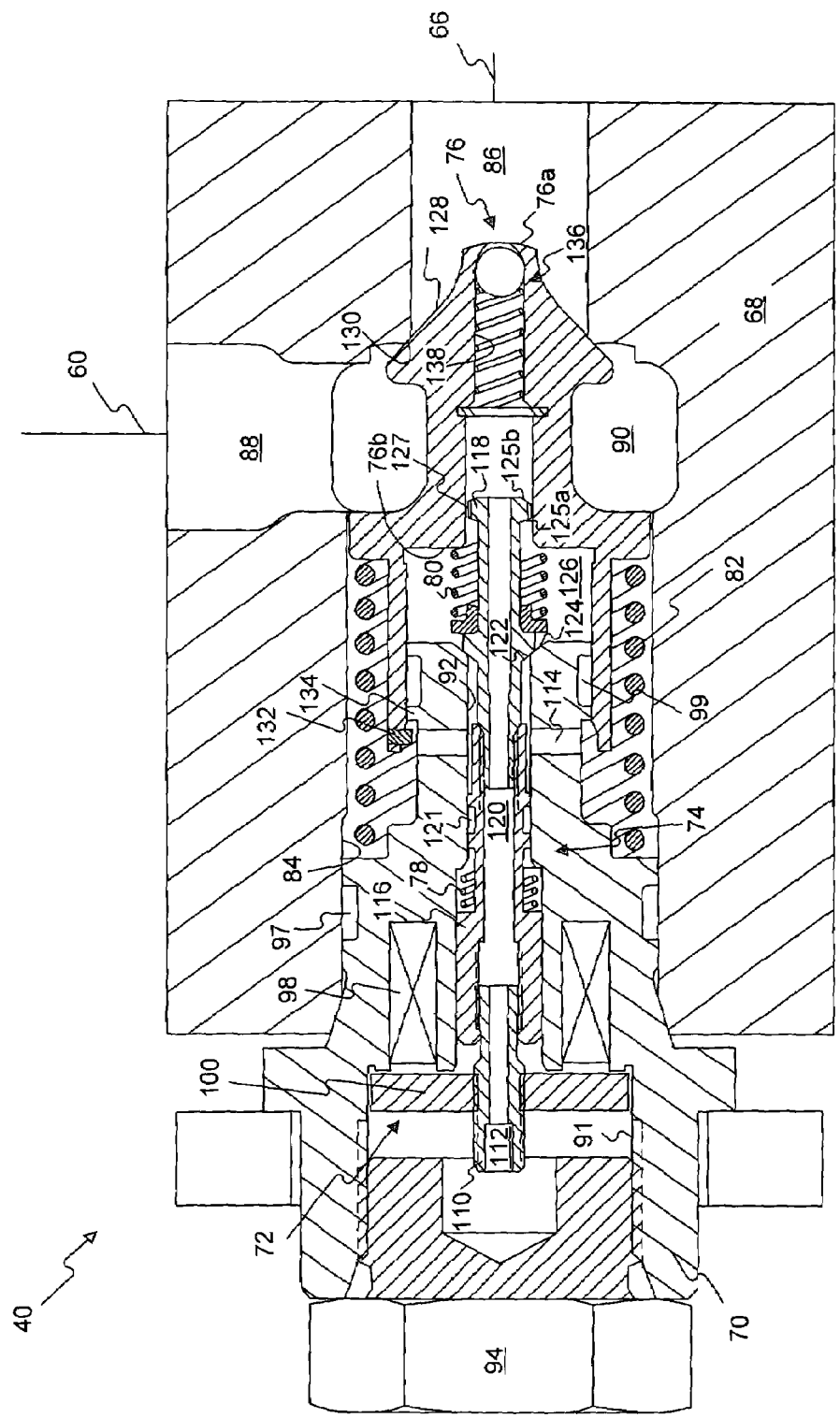
FIG. 3 is a cross-sectional illustration of an exemplary disclosed valve for the hydraulic circuit of FIG. 2

Head-end flow supply valve 40 may be disposed between source 26 and first chamber 50 and include components that cooperate to regulate a flow of pressurized fluid from source 26 to first chamber 50. In particular, as illustrated in FIG. 3, head-end flow supply valve 40 may include a valve body 68, an adapter element 70, a solenoid mechanism 72, a pilot element 74, a main poppet 76, and a plurality of biasing springs 78, 80, and 82. It is contemplated that the bias of one of springs 78 and 80 may be reduced or omitted entirely, if desired.

Valve body 68 may include a central bore 84, an inlet port 86, and an outlet port 88. An annulus 90 may connect central bore 84, inlet port 86, and outlet port 88. It is contemplated that valve body 68 may be dedicated to housing head-end flow supply valve 40 or may additionally house one or more of head-end drain valve 36, rod-end drain valve 38, and rod-end flow supply valve 42.

Adapter element 70 may be disposed within central bore 84 and configured to house solenoid mechanism 72 and pilot element 74. In particular, adapter element 70 may include a central bore 91 for housing solenoid mechanism 72, and a counter bore 92 for housing pilot element 74. A plug 94 may threadingly engage adapter element 70 to cap an end of adapter element 70 that extends from valve body 68. It is contemplated that one or more sealing devices (not shown) such as, for example, o-rings or other such sealing devices may be disposed within a groove 97 and a groove 99 of adapter element 70 to minimize leakage between valve body 68 and adapter element 70 and between adapter element 70 and main poppet 76, respectively.

Solenoid mechanism 72 may be disposed within adapter element 70 and configured to proportionally move pilot element 74 against the bias of springs 78 and 80 in response to an applied current. Specifically, solenoid mechanism 72 may include an electromagnetic coil 98 and an armature 100 having a pin 110 threadingly connected to pilot element 74. As a current is applied to electromagnetic coil 98, armature 100 may be drawn against the bias of springs 78 and 80 toward electromagnetic coil 98. The magnitude of the current applied to electromagnetic coil 98 may determine the compression of springs 78 and 80 and, in turn, how close armature 100 is drawn to electromagnetic coil 98. Pin 110 may include a central bore 112 to minimize resistance and the creation of undesired pressure fluctuations within head-end flow supply valve 40, as armature 100 and pin 110 move within adapter element 70.

Pilot element 74 may be a zero-leak type valve that is slidably disposed within adapter element 70 to open and close a fluid passageway 114. In particular, pilot element 74 may include a pilot stem 116 threadingly connected to a check element 118 and to pin 110. Pin 110, in conjunction with armature 100 and pilot stem 116 may function to adjust the relative position of check element 118 within adapter element 70. A central bore 120 may extend through both pilot stem 116 and check element 118 to fluidly communicate with central bore 112. Pilot stem 116 may include an external groove 121 configured to hold a sealing element such as an o-ring to minimize leakage of fluid between pilot element 74 and counter bore 92. Check element 118 may include a surface 122 configured to engage a seat 124 of adapter element 70, and an orifice 127 that restricts the flow of fluid from inlet port 86 to fluid passageway 114. Orifice 127 may be a diametral fit, a notch, or drilled passage. When surface 122 and seat 124 are engaged, fluid from inlet port 86 may be prevented from flowing to fluid passageway 114 via orifice 127. When solenoid mechanism 72 is energized to draw armature 100 and pin 110 toward electromagnetic coil 98, surface 122 and seat 124 may be moved away from each other, thereby fluidly connecting inlet port 86 and fluid passageway 114 via orifice 127. Fluid passageway 114 may be in fluid communication with outlet port 88. It is contemplated that pilot stem 116 and check element 118 may alternatively embody a single integral component, if desired.

Forces created at one or more hydraulic surfaces 125*a,b* of check element 118 may affect movement of pilot element 74. The force area of hydraulic surface 125*a* may be the difference of the area formed by the sliding diameter at or near orifice 127 and the area formed by the contact of pilot surface 122 with seat 124. And the force area of hydraulic surface 125*b* may be the difference of the area formed by the siding diameter at or near orifice 127 and the moving diameter area formed at or the opposing end of pin 110. The two described force areas of hydraulic surfaces 125*a* and 125*b* may be nearly equal. As fluid from inlet port 86 is flowing through orifice 127 to fluid passageway 114, the pressure of the fluid acting on hydraulic surfaces 125*a,b* may join or oppose the force imparted by solenoid mechanism 72 on pilot element 74 to move check element 118. For example, as the supply pressure of the fluid from inlet port 86 acts on hydraulic surface 125*b* increases, surface 122 and seat 124 may be moved toward each other, thereby restricting the flow of fluid through fluid passageway 114. Conversely, when the pressure of the fluid acting on hydraulic surface 125b decreases, the fluid acting on hydraulic surface 125a may move surface 122 of check element 118 away from seat 124, thereby decreasing the restriction fluid flowing through fluid passageway 114.

Main poppet 76 may be a zero-leak type valve that is configured to selectively allow fluid flow from inlet port 86 to outlet port 88. Specifically, a surface 128 of main poppet 76 may be situated to engage a seat 130 of valve body 68. When surface 128 and seat 130 are engaged, fluid flow from inlet port 86 to outlet port 88 may be prevented. Conversely, when surface 128 and seat 130 are away from each other, fluid may flow from inlet port 86 to outlet port 88. The area between surface 128 and seat 130, coupled with the pressure at a nose end 76a of main poppet 76, may determine a flow rate of fluid from inlet port 86 to outlet port 88.

Surface 128 may selectively engage and disengage seat 130 in response to movement of pilot element 74. In particular, main poppet 76, together with valve body 68, adapter element 70, and pilot element 74, may form a control chamber 126. A force generated by fluid acting on nose end 76a of main poppet 76 may oppose a force generated by fluid within control chamber 126 acting on a chamber end 76b of main poppet 76 and a force generated by the compression of biasing springs 80 and 82. To open main poppet 76, surface 122 may be moved away from seat 124 to drain fluid from control chamber 126. When fluid is drained from control chamber 126, fluid acting on nose end 76a of main poppet 76 may overcome the force generated by biasing springs 80 and 82 to move main poppet 76 toward pilot element 74. To close main poppet 76, solenoid mechanism 72 may be de-energized to allow biasing springs 80 and 82 to return pilot element 74 to the fluid-blocking position (e.g., where surface 122 engages seat 124). When pilot element 74 is in the fluid-blocking position, pressure may build within control chamber 126 that acts to close main poppet 76 (e.g., to move surface 128 into engagement with seat 130).

Fluctuations in the supply pressure at inlet port 86 may affect movement of main poppet 76. In particular, as described above, an increase in supply pressure from inlet port 86 may cause movement of pilot element 74 that restricts the flow of fluid through fluid passageway 114, while a decrease in the supply pressure may cause movement of pilot element 74 that decreases the restriction of fluid flow through fluid passageway 114. An increase in restriction through passageway 114 may result in an increase in pressure within control chamber 126 that allows main poppet 76 to move, due to the bias of spring 82 and closing flow forces, toward a fluid blocking position (e.g., movement of surface 128 toward seat 130), thereby maintaining substantially the same flow rate of fluid from inlet port 86 to outlet port 88 during an increase in supply pressure. A decrease in restriction through passageway 114 may result in a decrease in pressure within control chamber 126 that allows main poppet to move, due to the bias of spring 82 and closing flow forces, toward a fluid passing position (e.g., movement of surface 128 away from seat 130), thereby maintaining substantially the same flow rate of fluid from inlet port 86 to outlet port 88 during a decrease in supply pressure.

Main poppet 76 may be connected to adapter element 70 for assembly into valve body 68 as a cartridge-type valve. In one example, main poppet 76 may include a pin member 132 that engages a land 134 of adapter element 70 after assembly of main poppet 76 to adapter element 70. In this manner, a sub assembly consisting of adapter element 70, pilot element 74, main poppet 76, and springs 78–82 may be created. A space may be maintained between pin member 132 and adapter element 70 after assembly into valve body 68.

A check valve element 136 may be disposed within a central bore 138 of main poppet 76 to facilitate one-directional flow from inlet port 86 through main poppet 76. It is contemplated that check valve element 136 may be omitted, if desired. It is also contemplated that when check valve element 136 is present, the sealing element normally disposed within in external groove 121 may be omitted to reduce pilot element hysteresis. It is further contemplated that a restrictive orifice (not shown) may be substituted for check valve element 136, if desired. When a restrictive orifice is included within rod-end flow supply valve 42, the amount of restriction could be adjusted such that rod-end flow supply valve 42 may be area or flow controlled.

Rod-end flow supply valve 42 (referring to FIG. 2) may be disposed between source 26 and second chamber 52 and include components that cooperate to regulate a flow of pressurized fluid from source 26 to second chamber 52. Because the components and operation of rod-end flow supply valve 42 are substantially similar to that of head-end flow supply valve 40, the description of rod-end flow supply valve 42 will be omitted from this disclosure.

INDUSTRIAL APPLICABILITY

The disclosed hydraulic system may be applicable to any work machine that includes a fluid actuator where precise control of pressures and/or flows of fluid supplied to the actuator is desired. The disclosed hydraulic system may provide high-response pressure regulation that results in consistent, predictable actuator performance in a low-cost, simple configuration. The operation of hydraulic system 22 will now be explained.

Hydraulic cylinder 16 may be movable by fluid pressure in response to an operator input. Fluid may be pressurized by source 26 and directed to head-end and rod-end flow supply valves 40 and 42. In response to an operator input to either extend or retract piston assembly 48 relative to tube 46, solenoid mechanism 72 of the appropriate one of head-end and rod-end flow supply valves 40 and 42 may be energized to draw armature 100 toward electromagnetic coil 98. As armature 100 is drawn toward electromagnetic coil 98, connected pilot element 74 may move to disengage surface 122 from seat 124 an appropriate amount to thereby drain control chamber 126 at an appropriate rate. As control chamber 126 is drained, a pressure differential may be created across main poppet 76 that overcomes the bias of springs 80 and 82 and causes surface 128 of main poppet 76 to disengage seat 130 of valve body 68 an appropriate amount, thereby fluidly connecting inlet port 86 to outlet port 88 and subsequently filling the one of first and second chambers 50, 52 with pressurized fluid at a desired rate.

The amount of current supplied to solenoid mechanism 72 may be based on an assumed pressure of the fluid within control chamber 126 and a desired flow rate of fluid from control chamber 126. In particular, the amount of current directed to electromagnetic coil 98 may correspond to a compression of springs 78 and 80 that results in a predetermined flow area between surface 122 and seat 124. The predetermined flow area between surface 122 and seat 124 may facilitate a predetermined rate of fluid flow from control chamber 126 and the subsequent pressure differential across main poppet 76 that creates a predetermined flow area between surface 128 and seat 130. Similarly, the predetermined flow area between surface 128 and seat 130 may facilitate a predetermined rate of fluid flow from inlet port 86 to outlet port 88 that results in the desired actuation speed of hydraulic cylinder 16. The relationship between the applied current and the compression of springs 78–82, the area of hydraulic surfaces 125a,b, the flow area of orifice 127, and the main metering flow forces that results in the desired flow areas may be determined through analytical practices, lab testing, field testing, and/or through other methods known in the art.

Head and rod-end flow supply valves 40,42 may accommodate for situations where the pressure of the fluid supplied to nose end 76a deviates from the assumed pressure. Specifically, because multiple actuators may be fluidly connected to source 26, the operation of one of the actuators may affect the pressure and subsequent flow of fluid directed to hydraulic cylinder 16. If left unregulated, these pressure fluctuations could result in inconsistent and/or unexpected motion of hydraulic cylinder 16 and work implement 14. These affects may be accounted for by hydraulic surfaces 125a,b acting to proportionally move pilot element 74 in response to fluid pressures within hydraulic system 22 and the resulting flow forces acting on surface 128, thereby providing a substantially constant fluid flow from inlet port 86 to outlet port 88. For example, as the pressure supplied at inlet port 86 increases, the force generated at hydraulic surface 125b likewise increases to move surface 122 against the draw of solenoid mechanism 72 toward seat 124, thereby decreasing the effective flow area between surface 122 and seat 124. This increased restriction on the fluid leaving control chamber 126 may increase the pressure of the fluid within control chamber 126 acting on chamber end 76b, resulting in movement of surface 128 toward seat 130. The movement of surface 128 toward seat 130 may decrease the effective flow area between inlet port 86 and outlet port 88, thereby providing for substantially the same flow rate experienced with the larger flow area prior to the increase in pressure. Conversely, as the pressure supplied at inlet port 86 decreases, the force generated at hydraulic surface 125b and opposing the draw of solenoid mechanism 72 may likewise decrease such that the force generated at hydraulic surface 125a acts to move surface 122 away from seat 124. This decreased restriction on the fluid leaving control chamber 126 may decrease the pressure of the fluid within control chamber 126 acting on chamber end 76b, resulting in movement of surface 128 away from seat 130. The movement of surface 128 away from seat 130 may increase the effective flow area between inlet port 86 and outlet port 88, thereby providing for substantially the same flow rate experienced with the smaller flow area prior to the decrease in pressure.

It will be apparent to those skilled in the art that various modifications and variations can be made to the disclosed metering valve and hydraulic circuit. Other embodiments will be apparent to those skilled in the art from consideration of the specification and practice of the disclosed metering valve and hydraulic circuit. For example, it is contemplated that head and rod-end drain valves 36, 38 (referring to FIG. 2) may be substantially similar in construction and function to head and rod-end flow supply valves 40, 42. It is intended that the specification and examples be considered as exemplary only, with a true scope being indicated by the following claims and their equivalents.

What is claimed is:

1. A metering valve, comprising:
    a valve body having an inlet and an outlet;
    a main poppet being disposed within the valve body between the inlet and the outlet, having a nose end and a chamber end, and being movable between a flow-passing position at which fluid flows from the inlet to the outlet, and a flow-blocking position at which fluid flow between the inlet and outlet is blocked;
    a pilot element movable to selectively communicate the chamber end of the main poppet with a drain in fluid communication with the outlet, thereby affecting movement of the main poppet between the flow-passing and flow-blocking positions; and
    a solenoid mechanism operable to move the pilot element, wherein the position of the pilot element is affected by a fluid pressure at the inlet of the valve body.

2. The metering valve of claim 1, wherein the solenoid mechanism is operable to move the pilot element a predetermined amount, thereby moving the main poppet a predetermined amount.

3. The metering valve of claim 2, wherein the predetermined amount is based on an assumed fluid pressure at the inlet.

4. The metering valve of claim 3, wherein the pilot element is movable in response to the fluid pressure at the inlet to maintain a substantially constant flow rate of fluid from the inlet to the outlet.

5. The metering valve of claim 1, wherein the pilot element includes:
    an adjuster connected to the solenoid mechanism and configured to adjust a position of the pilot element relative to the solenoid mechanism; and
    a check element connected to the adjuster.

6. The metering valve of claim 1, further including a spring disposed between the pilot element and the main poppet.

7. The metering valve of claim 1, further including:
    an adapter disposed within the valve body;
    a spring disposed between the adapter and the main poppet; and
    a spring disposed between the adapter and the pilot element.

8. The metering valve of claim 7, further including a pin preventing disassembly of the main poppet from the adapter.

9. The metering valve of claim 1, further including a central bore extending through the pilot element.

10. The metering valve of claim 9, wherein the solenoid mechanism includes:
    an electromagnet coil;
    an armature;
    a pin element connected to the armature; and
    a central bore extending through the armature and pin element and being in communication with the central bore of the pilot element.

11. The metering valve of claim 10, further including:
    a central bore extending through the main poppet and being in communication with the central bore of the pilot element; and
    a check valve element disposed within the central bore of the main poppet.

12. A method of operating a metering valve including a valve body having an inlet and an outlet, and a main poppet having a nose end and a chamber end; the method, comprising:
    directing a flow of pressurized fluid to the main poppet of the metering valve;
    electronically moving a pilot element to hydraulically move the main poppet to a predetermined position and allow the pressurized fluid to flow through the metering valve at a desired rate, wherein moving the main poppet includes placing the chamber end of the main poppet in fluid communication with the outlet; and automatically hydraulically adjusting the position of the pilot element in response to a pressure of the fluid to maintain the desired flow rate through the metering valve.

13. The method of claim 12, wherein the predetermined position is based on an assumed fluid pressure.

14. The method of claim 12, further including mechanically adjusting the position of the pilot element relative to a solenoid mechanism.

15. The method of claim 12, further including mechanically biasing the pilot element and the main poppet toward flow-blocking positions.

16. The method of claim 12, further including allowing fluid to pass through the pilot element during movement of the pilot element.

17. The method of claim 12, further including:
allowing fluid to pass through the main poppet; and
restricting the flow of fluid through the main poppet to a single flow direction.

18. A work machine, comprising:
a work tool;
a hydraulic cylinder operatively connected to move the work tool and having a at least one chamber;
a source of pressurized fluid in communication with the at least one chamber; and
a metering valve configured to meter the pressurized fluid into the at least one chamber, the metering valve including;
a valve body having an inlet and an outlet;
a main poppet being disposed within the valve body between the inlet and the outlet, having a nose end and a chamber end, and being movable between a flow-passing position at which fluid flows from the inlet to the outlet, and a flow-blocking position at which fluid flow between the inlet and outlet is blocked;
a pilot element movable to selectively communicate the chamber end of the main poppet with a drain in fluid communication with the outlet, thereby affecting movement of the main poppet between the flow-passing and flow-blocking positions; and
a solenoid mechanism operable to move the pilot element,
wherein the position of the pilot element is affected by a fluid pressure at the inlet.

19. The work machine of claim 18, wherein:
the solenoid is operable to move the pilot element a predetermined amount, thereby moving the main poppet a predetermined amount; and
the predetermined amount is based on an assumed fluid pressure at the inlet.

20. The work machine of claim 18, wherein the pilot element is movable in response to the fluid pressure at the inlet to maintain a substantially constant flow rate of fluid from the in let to the outlet.

21. The work machine of claim 18, wherein:
the pilot element includes a central bore extending through the pilot element; and
the solenoid mechanism includes:
an electromagnet coil;
an armature;
a pin element connected to the armature; and
a central bore extending through the armature and pin element and being in communication with the central bore of the pilot element.

22. The work machine of claim 21, further including:
a central bore extending through the main poppet and being in communication with the central bore of the pilot element; and
a check valve element disposed within the central bore of the main poppet.

* * * * *